(12) United States Patent
Machida et al.

(10) Patent No.: US 6,848,821 B2
(45) Date of Patent: Feb. 1, 2005

(54) MOTOR VEHICLE LAMP, BACK COVER OF MOTOR VEHICLE LAMP, AND METHOD FOR MANUFACTURING BACK COVER OF MOTOR VEHICLE

(75) Inventors: Yosikazu Machida, Isehara (JP); Kazuhiro Asao, Yokkaichi (JP)

(73) Assignees: Ichikoh Industries, Ltd., Tokyo (JP); Sumitomo Wiring Systems, Ltd., Yokkaichi (JP)

( * ) Notice: Subject to any disclaimer, the term of this patent is extended or adjusted under 35 U.S.C. 154(b) by 80 days.

(21) Appl. No.: 10/440,408

(22) Filed: May 19, 2003

(65) Prior Publication Data

US 2004/0004840 A1 Jan. 8, 2004

(30) Foreign Application Priority Data

May 20, 2002  (JP) ........................................ 2002-144749

(51) Int. Cl.[7] .............................................. F21V 15/01
(52) U.S. Cl. ........................................ 362/546; 362/544
(58) Field of Search ................................ 362/507, 540, 362/543–546, 362

(56) References Cited

U.S. PATENT DOCUMENTS

| | | | | |
|---|---|---|---|---|
| 4,189,709 A | * | 2/1980 | Gosswiller | ................ 340/472 |
| 4,646,207 A | * | 2/1987 | Levin et al. | ................ 362/522 |
| 4,774,637 A | | 9/1988 | Budde et al. | |
| 5,446,634 A | * | 8/1995 | Okubo | ................ 362/147 |
| 5,519,596 A | | 5/1996 | Woolverton | |

FOREIGN PATENT DOCUMENTS

| | | | | |
|---|---|---|---|---|
| EP | 0 945 671 A2 | | 9/1999 | |
| FR | 2 437 571 | | 4/1980 | |
| GB | 2095388 A | * | 9/1982 | .......... F21V/23/06 |
| JP | 8-249919 A | | 9/1996 | |
| JP | 9-142205 A | | 6/1997 | |

* cited by examiner

*Primary Examiner*—Laura K. Tso
(74) *Attorney, Agent, or Firm*—Foley & Lardner LLP (57) ABSTRACT

A back cover of a motor vehicle lamp includes a plurality of types of blocks provided with joints that join the blocks together; terminals fixed to a connector of the plurality of types of blocks, and bulb holders; and a cord wired between the terminals. The blocks are selected to match with a structure of a motor vehicle lamp, and the selected blocks are joined together via the joints. As a result, it is possible to structure the back cover to match with a variety of structures of the motor vehicle lamp. Further, it is possible to have in common a plurality of types of blocks that constitute the back cover. Therefore, it is possible to manufacture the back cover at low cost.

20 Claims, 11 Drawing Sheets

MOTOR VEHICLE LAMP, BACK COVER OF MOTOR VEHICLE LAMP, AND METHOD FOR MANUFACTURING BACK COVER OF MOTOR VEHICLE

Vehicle lamps that have back covers are disclosed, for example, in U.S. Pat. Publication No. 4,774,637, Japanese Patent Application Laid-open No. 08-249919, and Japanese Patent Application Laid-open No. 09-143205.

BACKGROUND OF THE INVENTION

1. Field of the Invention

The present invention relates to a motor vehicle lamp that has a back cover. More particularly, this invention relates to a back cover that has one or a plurality of bulbs for a motor vehicle lamp. The present invention further relates to a method for manufacturing a back cover that has one or a plurality of bulbs for a motor vehicle lamp.

2. Description of the Related Art

The motor vehicle lamp has lamp chambers partitioned with a lamp housing, a lamp lens, and a back cover. One or a plurality of bulbs are electrically connected and detachably fitted to the back cover. This back cover is provided with a lamp-side connector electrically connected and detachably fitted to a connector at a bulb side.

However, the motor vehicle lamp has the back cover exclusively structured to match with the structure of each motor vehicle lamp. Therefore the cost of manufacturing the back cover becomes very high.

SUMMARY OF THE INVENTION

It is an object of the present invention to solve at least the problems in the conventional technology.

The present invention provides a back cover to which one or a plurality of bulbs are electrically connected and detachably fitted, and which is provided with a lamp-side connector electrically connected and detachably fitted to a connector at a bulb side. This back cover comprises a plurality of types of blocks provided with joints that join the blocks with each other, terminals fixed to connectors of the plurality of types of blocks and bulb holders, and a cord wired between the terminals. The blocks are selected to match with the structure of the motor vehicle lamp, and the selected blocks are joined together via the joints.

As a result, according to one aspect of the present invention, it is possible to structure the back cover to match with a variety of structures of the motor vehicle lamp. Further, according to the aspect, it is possible to have in common a plurality of blocks that constitute the back cover. Therefore, it is possible to manufacture the back cover at low cost.

According to another aspect, it is possible to dispose blocks having connectors to match with the layout of the lamp-side connectors. Therefore, it is possible to sufficiently cope with motor vehicles of different vehicle types or different grades. Even when external shapes of lamp lenses are the same, depending on a difference of vehicle types or grades of vehicles, it often happens that shapes of vehicle parts that face the back cover and are located near the back cover are changed, or other vehicle parts are added. Therefore, there occurs a change in the position of connection between the lamp-side connector and the connector at the power source side (i.e., a vehicle body side). The present invention can sufficiently cope with this situation by changing the positions of the blocks that have the connectors.

The other objects, features and advantages of the present invention are specifically set forth in or will become apparent from the following detailed descriptions of the invention when read in conjunction with the accompanying drawings.

DETAILED DESCRIPTIONS

Exemplary embodiments of a motor vehicle lamp according to the present invention, one embodiment of a back cover of a motor vehicle lamp according to the present invention, and one embodiment of a method of manufacturing a back cover of a motor vehicle lamp according to the present invention (hereinafter simply referred to as a "motor vehicle lamp", a "back cover", and a "method of manufacturing a back cover") will be explained in detail below with reference to the accompanying drawings.

Figure 1:
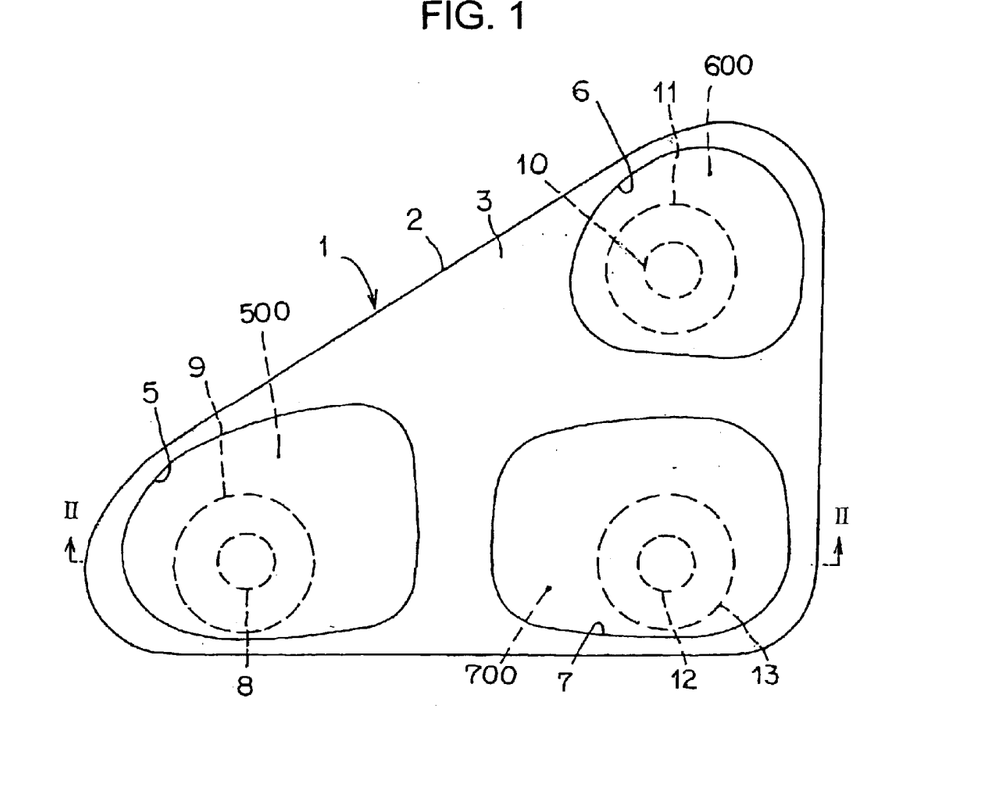
FIG. 1 is a front view of a motor vehicle lamp according to an embodiment of the present invention.
Figure 2:
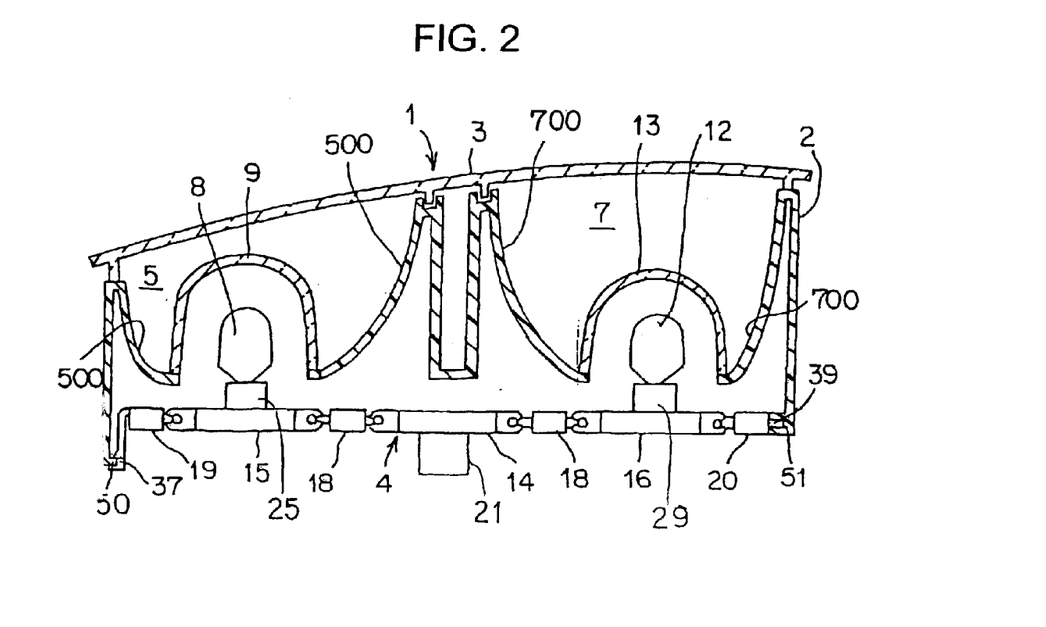
FIG. 2 is a cross-sectional view of the motor vehicle lamp cut along a line II—II in FIG. 1.

In FIG. 1 and FIG. 2, a reference numeral i denotes a motor vehicle lamp. The motor vehicle lamp 1 is installed at both left and right sides at the rear of an automobile as rear combination lamps. The structure of the motor vehicle lamp 1 will be explained below.

The motor vehicle lamp 1 has a first lamp chamber 5, a second lamp chamber 6, and a third lamp chamber 7 that are partitioned respectively with a lamp housing 2 made of a synthetic resin, a lamp lens 3, and a back cover 4 that are mounted on the motor vehicle lamp 1.

Within the first lamp chamber 5, there are disposed a first bulb 8, a first cap 9, and a first reflector 500 respectively. Within the second lamp chamber 6, there are disposed a second bulb 10, a second cap 11, and a second reflector 600 respectively. Within the third lamp chamber 7, there are disposed a third bulb 12, a third cap 13, and a third reflector 700 respectively. In this example, the first reflector 500, the second reflector 600, and the third reflector 700 are provided integrally with the lamp housing 2. However, in the present invention, the first reflector 500, the second reflector 600, the third reflector 700, and the lamp housing 2 may be provided separately.

The first bulb 8 is a wedge base type bulb of a double filament. The first cap 9 is a red color light transmittable cap. A reflection surface is provided based on aluminum deposition or silver coating, on the surface of the first reflector 500. The first lamp chamber 5, the first bulb 8, the first cap 9, and the first reflector 500 constitute a tail and stop lamp of the rear combination lamp. In other words, when the first bulb 8 is turned on, the light from the first bulb 8 is passed through the first cap 9, and is colored in red of a tail lamp function and a stop lamp function. The first reflector 500 reflects the red color light of the tail lamp function and the stop lamp function, and this light passes through the lamp lens 3, and irradiates the light to the outside in a predetermined light distribution pattern.

The second bulb 10 is a wedge base type bulb of a single filament. The second cap 11 is an amber color light transmittable cap. A reflection surface is provided based on aluminum deposition or silver coating, on the surface of the second reflector 600. The second lamp chamber 6, the second bulb 10, the second cap 11, and the second reflector 600 constitute a turn signal lamp of the rear combination lamp. In other words, when the second bulb 10 is turned on, the light from the second bulb 10 is passed through the second cap 11, and is colored in amber of a turn signal lamp function. The second reflector 600 reflects the amber color light of the turn signal lamp function, and this light passes through the lamp lens 3, and irradiates the light to the outside in a predetermined light distribution pattern.

The third bulb 12 is a wedge base type bulb of a single filament. The third cap 13 is an achromatic light transmittable cap. A reflection surface is provided based on aluminum deposition or silver coating, on the surface of the third reflector 700. The third lamp chamber 7, the third bulb 12, the third cap 13, and the third reflector 700 constitute a backup lamp of the rear combination lamp. In other words, when the third bulb 12 is turned on, the light from the third bulb 12 is passed through the third cap 13 as an incandescent light of the backup lamp function. The third reflector 700 reflects the incandescent light of the backup lamp function, and this light passes through the lamp lens 3, and irradiates the light to the outside in a predetermined light distribution pattern.

Figure 3:
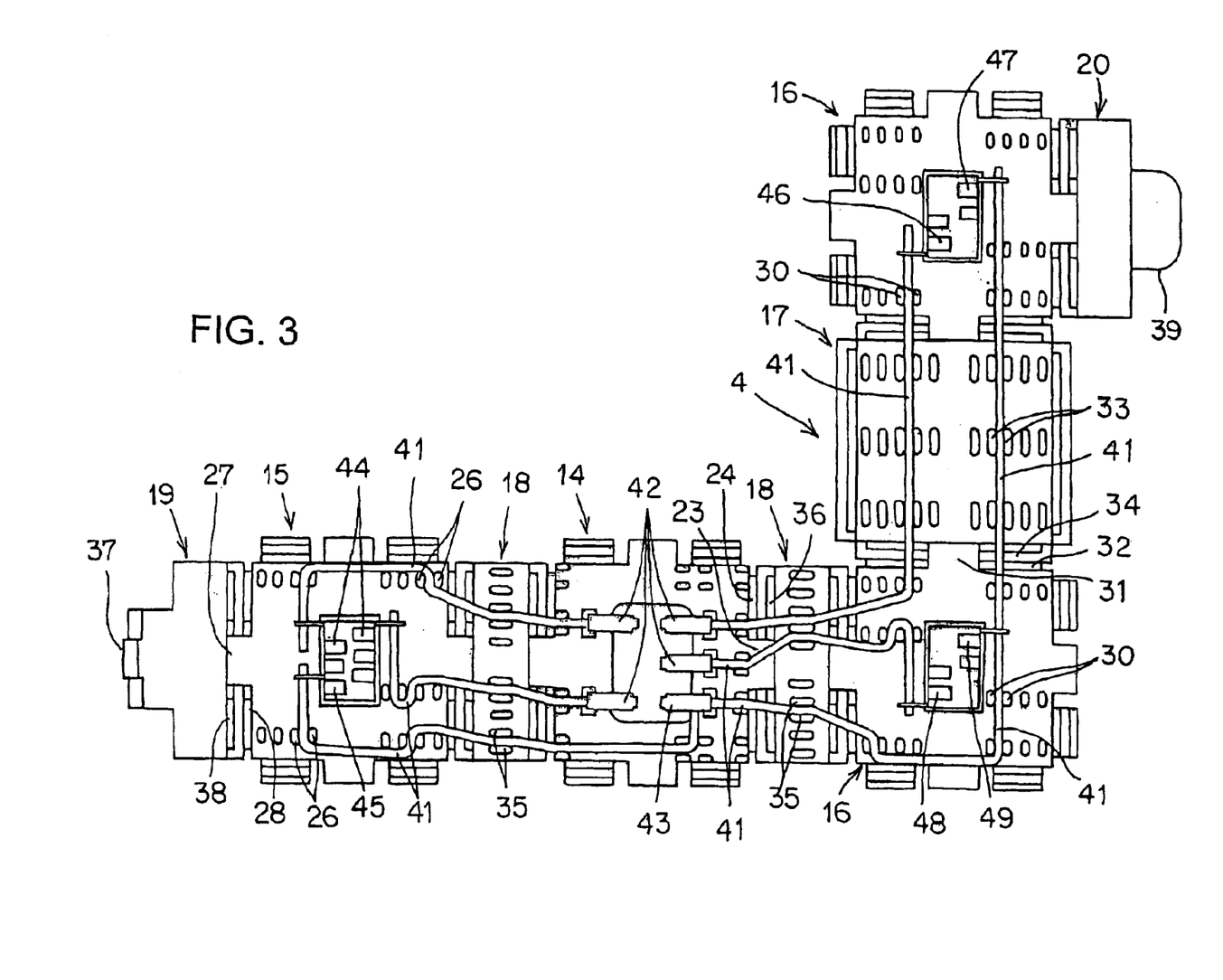
FIG. 3 is a front view of a back cover that shows a layout of the back cover.

As shown in the layout of FIG. 3, the back cover 4 consists of one connector block 14, one first bulb holder block 15, two second bulb holder blocks 16, one first joint block 17, two second joint blocks 18, one first fitting block (or a third joint block) 19, and one second fitting block (or a fourth joint block) 20.

Figure 4:
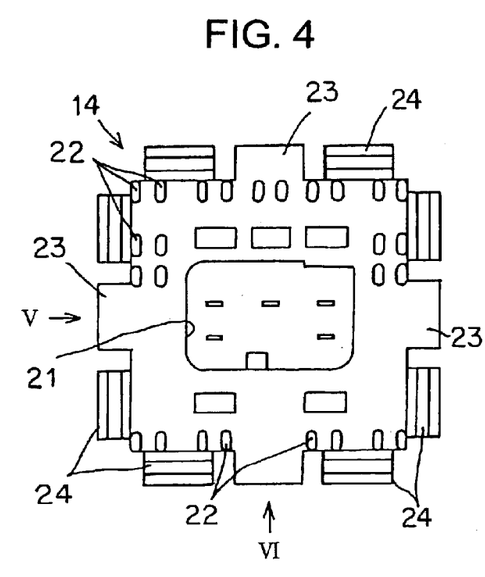
FIG. 4 is a front view of a connector block.
Figure 5:
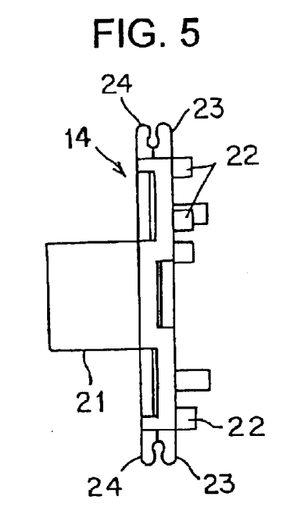
FIG. 5 is a side view of the connector block from a direction of an arrow mark V in FIG. 4.
Figure 6:
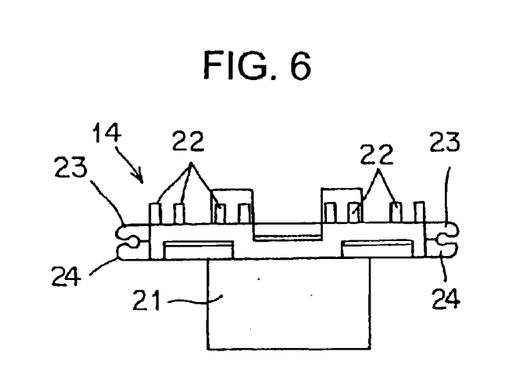
FIG. 6 is a side view of the connector block from a direction of an arrow mark VI in FIG. 4.

As shown in FIG. 4, FIG. 5, and FIG. 6, the connector block 14 consists of substantially a square plate-shaped block unit as viewed from the front side (i.e., the side facing the lamp chambers 5, 6, and 7). A connector 21 is integrally provided on the center of the connector block 14. A plurality of oval cord guide convexities 22 are integrally provided on the front surface of the connector block 14. An upper bearing 23 and a lower bearing 24 are integrally provided on each of the four sides of the connector block 14 respectively.

Figure 7:
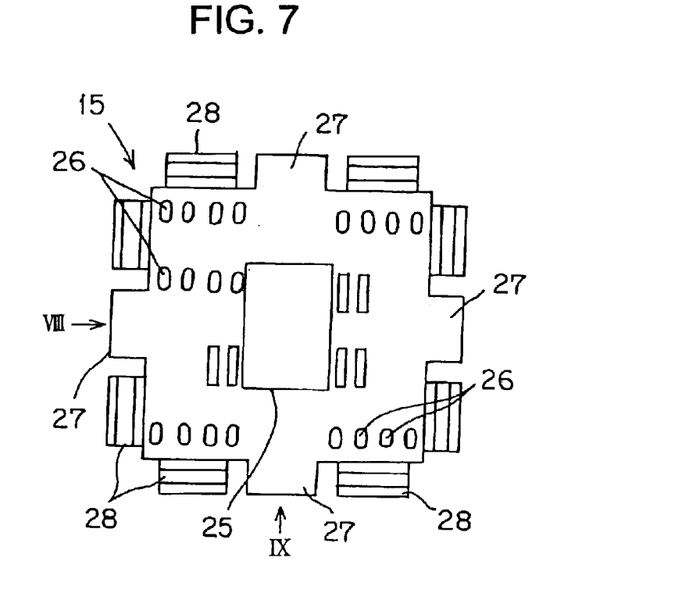
FIG. 7 is a front view of a first bulb holder block.
Figure 8:
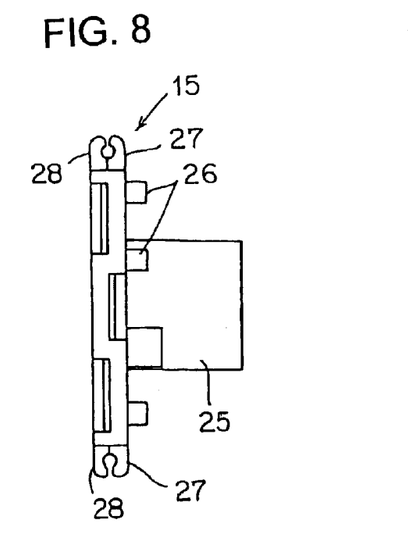
FIG. 8 is a side view of the first bulb holder block from a direction of an arrow mark VIII in FIG. 7.
Figure 9:
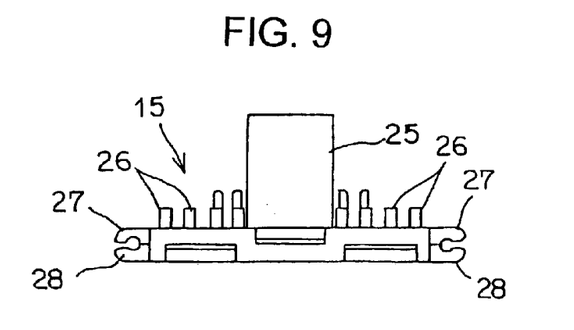
FIG. 9 is a side view of the first bulb holder block from a direction of an arrow mark IX in FIG. 7.

As shown in FIG. 7, FIG. 8, and FIG. 9, the first bulb holder block 15 consists of substantially a square plate-shaped block unit as viewed from the front side (i.e., the side facing the lamp chambers 5, 6, and 7). A first bulb holder 25 is integrally provided on the center of the first bulb holder block 15. A plurality of oval cord guide convexities 26 are integrally provided on the front surface of the first bulb holder block 15. An upper bearing 27 and a lower bearing 28 are integrally provided on each of the four sides of the first bulb holder block 15 respectively.

Figures 10, 11:
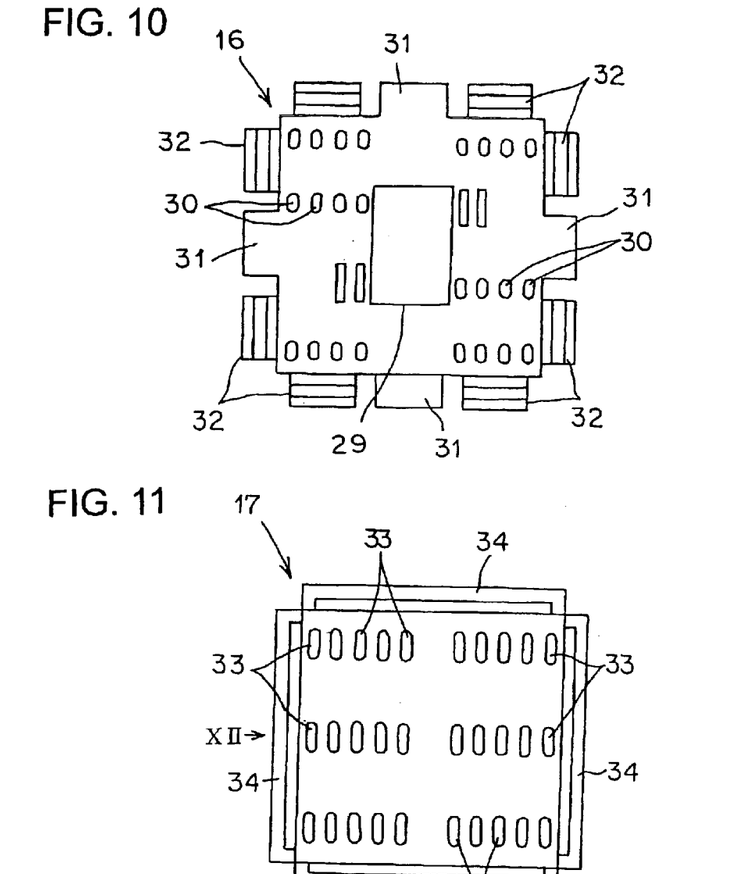
FIG. 10 is a front view of a second bulb holder block.
FIG. 11 is a front view of a first joint block.

As shown in FIG. 10, each second bulb holder block 16 consists of substantially a square plate-shaped block unit as viewed from the front side (i.e., the side facing the lamp chambers 5, 6, and 7). A second bulb holder 29 is integrally provided on the center of the second bulb holder block 16. A plurality of oval cord guide convexities 30 are integrally provided on the front surface of the second bulb holder block 16. An upper bearing 31 and a lower bearing 32 are integrally provided on each of the four sides of the second bulb holder block 16 respectively. Side views of the second bulb holder block 16 shown in FIG. 10 are substantially the same as the side views of the first bulb holder block 15 shown in FIG. 8 and FIG. 9, and, therefore, are omitted.

Figure 12:
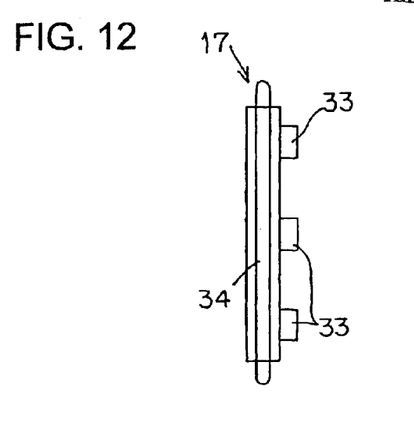
FIG. 12 is a side view of the first joint block from a direction of an arrow mark XII in FIG. 11.
Figure 13:
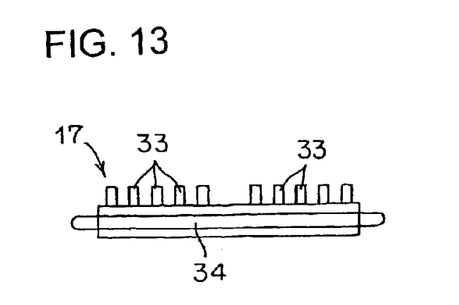
FIG. 13 is a side view of the first joint block from a direction of an arrow mark XIII in FIG. 11.

As shown in FIG. 11, FIG. 12, and FIG. 13, the first joint block 17 consists of substantially a square plate-shaped block unit as viewed from the front side (i.e., the side facing the lamp chambers 5, 6, and 7). A plurality of oval cord guide convexities 33 are integrally provided on the front surface of the first joint block 17. A shaft 34 having a circular cross section is integrally provided on the four sides of the first joint block 17 respectively.

Figure 14:
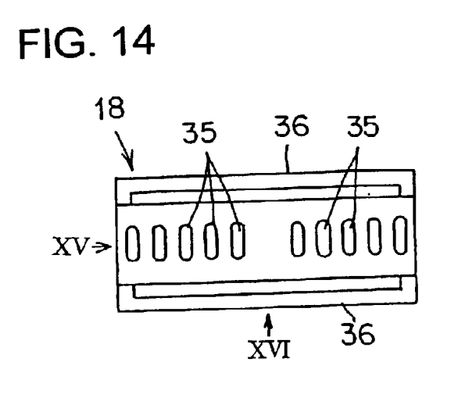
FIG. 14 is a front view of a second joint block.
Figure 15:
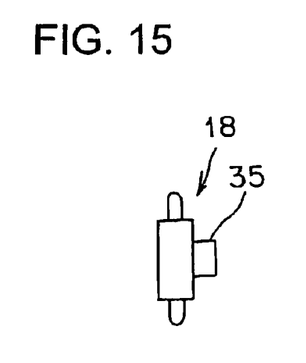
FIG. 15 is a side view of the second joint block from a direction of an arrow mark XV in FIG. 14.
Figure 16:
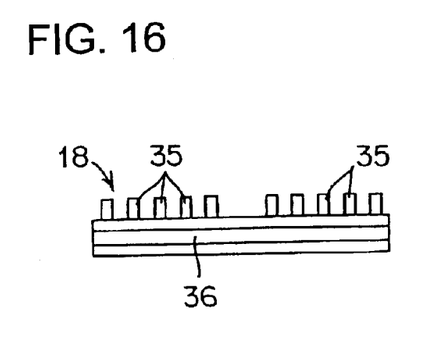
FIG. 16 is a side view of the second joint block from a direction of an arrow mark XVI in FIG. 14.

As shown in FIG. 14, FIG. 15, and FIG. 16, each second joint block 18 consists of substantially a rectangular plate-shaped block unit having its long side substantially equal to one side of each of the square blocks 14, 15, 16, and 17, as viewed from the front side (i.e., the side facing the lamp chambers 5, 6, and 7). A plurality of oval cord guide convexities 35 are integrally provided on the front surface of the second joint block 18. A shaft 36 having a circular cross section is integrally provided on the two long sides of the second joint block 18 respectively.

Figure 18:
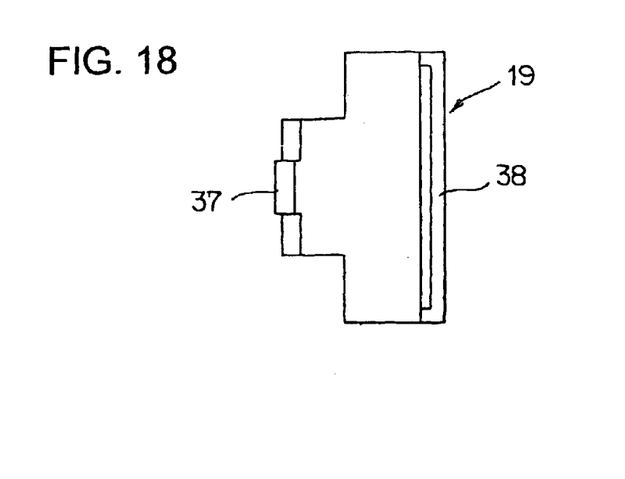
FIG. 18 is a front view of a first fitting block.

As shown in FIG. 18, the first fitting block 19 consists of substantially a rectangular plate-shaped block unit having its long side substantially equal to one side of each of the square blocks 14, 15, 16, and 17, as viewed from the front side (i.e., the side facing the lamp chambers 5, 6, and 7). An elastic engagement pawl 37 as a fitting section is integrally provided at the center of one long side of the first fitting block 19. A shaft 38 having a circular cross section is integrally provided on the other long side of the first fitting block 19.

Figure 19:
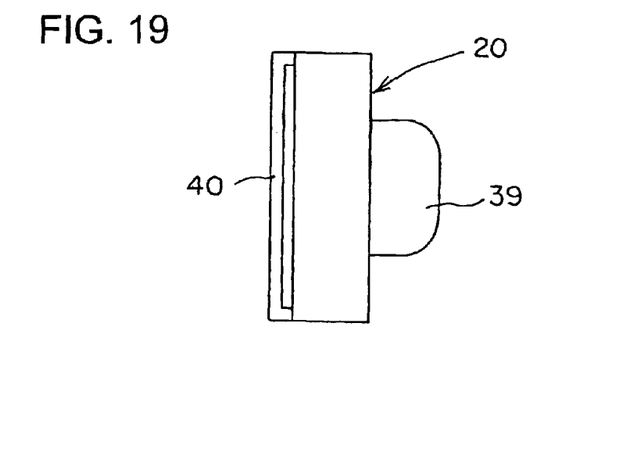
FIG. 19 is a front view of a second fitting block.

As shown in FIG. 19, the second fitting block 20 consists of substantially a rectangular plate-shaped block unit having its long side substantially equal to one side of each of the square blocks 14, 15, 16, and 17, as viewed from the front side (i.e., the side facing the lamp chambers 5, 6, and 7). A fitting convexity 39 as a fitting section is integrally provided at the center of one long side of the second fitting block 20. A shaft 40 having a circular cross section is integrally provided on the other long side of the second fitting block 20.

Candidate materials of the blocks 14 to 20 include polybutylene-telephthalate (PBT), polyamide (such as PA, PA6, PA11, PA12, PA66), polyoxymethylene (POM), acryronitrile-butadiene-styrene (ABS), polycarbonate (PC), polyethylene-telephthalate (PET), styrene-acryronitrile (AS), polypropylene (PP) and the like. Candidate materials also include polymer alloys that are blend polymers with each resin, such as PC-PET, PC-ABS, and PC-AS. Candidate materials further include a mixture of each resin with glass fiber or talc. Materials of the blocks 14 to 20 are suitably selected from among the above candidates, by taking into account heat resistance, impact resistance, chemical resistance, and the like.

A method, i.e., steps, of manufacturing the back cover 4 of the layout shown in FIG. 3 will be explained below.

First, the blocks 14, 15, 16, 17, 18, 19, and 20 are formed (a block formation step). These formed blocks 14, 15, 16, 17, 18, 19, and 20 are stocked as common parts.

Next, blocks that match with the structure of the motor vehicle lamp 1 (for example, numbers and types of the bulbs 8, 10, and 12) are selected from among the blocks 14 to 20 formed at the block formation step (a block selection step). In this example, one connector block 14, one first bulb holder block 15, two second bulb holder blocks 16, one first joint block 17, two second joint blocks 18, one first fitting block 19, and one second fitting block 20 are selected.

Figure 20:
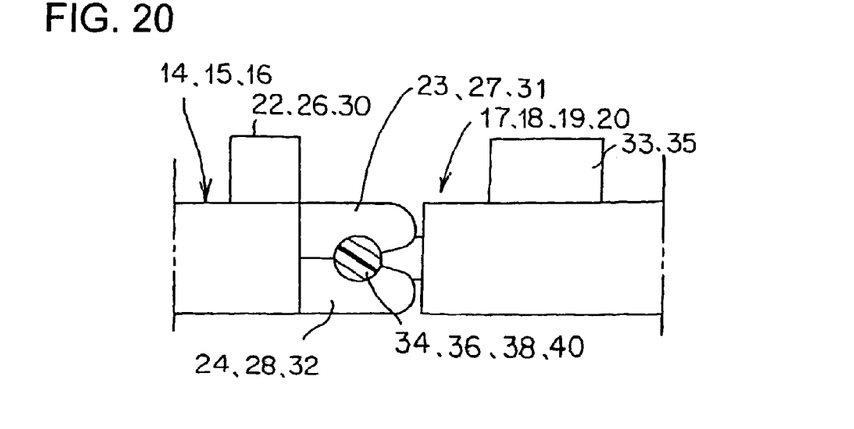
FIG. 20 is a partially cross-sectional view that shows a state of joining by a joint.
Figure 21:
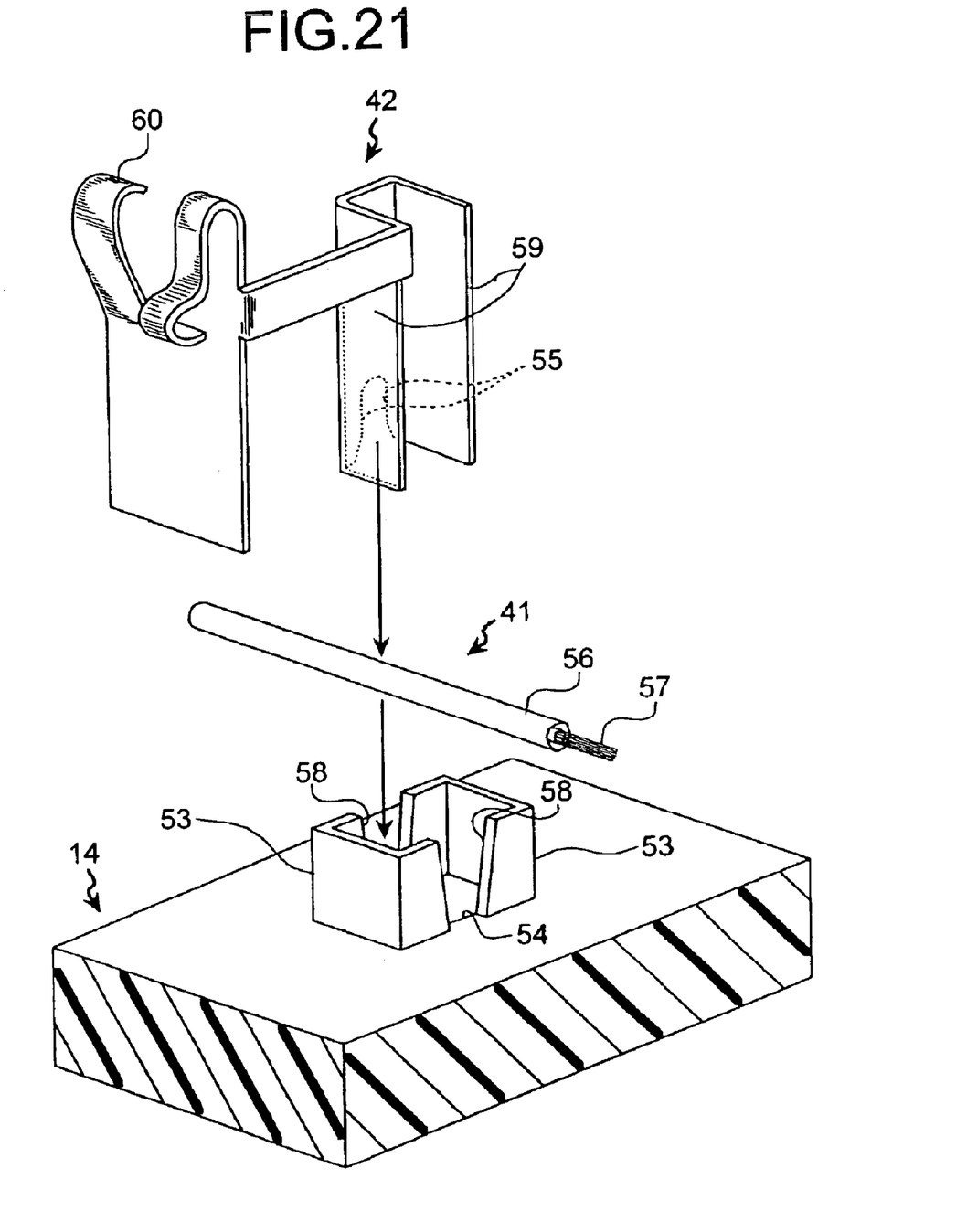
FIG. 21 is a breakdown perspective view of a terminal, a cord, and a block that shows a bite off structure.
Figure 22:
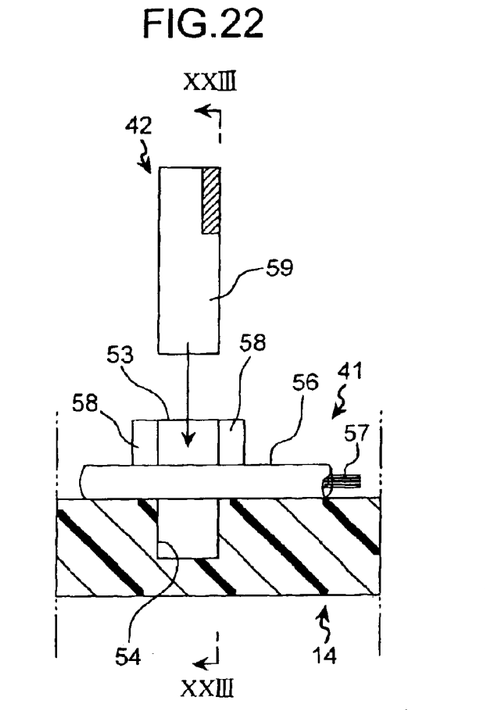
FIG. 22 is a partially cross-sectional view that shows a state before a terminal is fixed to a block.
Figure 23:
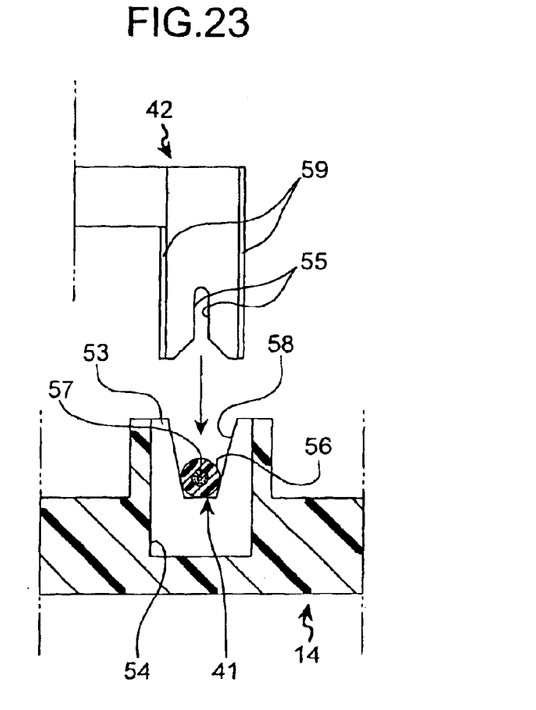
FIG. 23 is a cross-sectional view of the state cut along a line XXIII—XXIII shown in FIG. 22.
Figure 24:
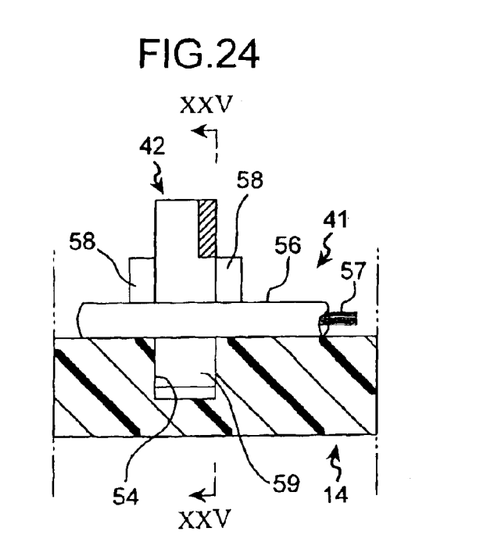
FIG. 24 is a partially cross-sectional view that shows a state that a terminal is fixed to a block.
Figure 25:
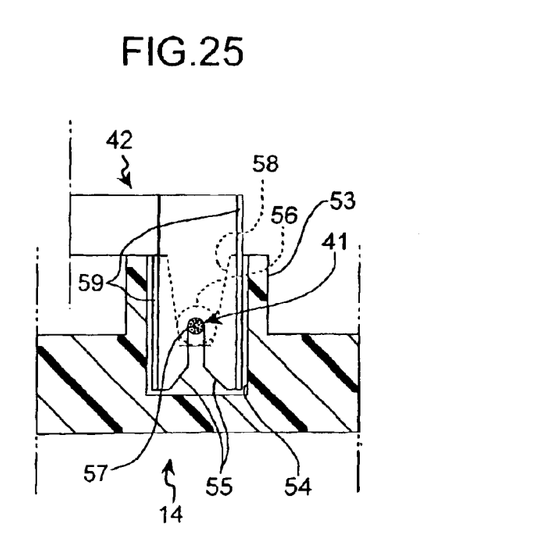
FIG. 25 is a cross-sectional view of the state cut along a line XXV—XXV shown in FIG. 24.

The blocks 14, 15, 16, 17, 18, 19, and 20 selected at the block selection step are disposed in the layout shown in FIG. 3, by matching these selected blocks with the structure of the motor vehicle lamp 1 (for example, the layout of the bulbs 8, 10, and 12 and the lamp-side connector 21 shown in FIG. 1 and FIG. 2). Next, the adjacent blocks are joined together via the joints (i.e., the upper and lower bearings 23, 24, 27, 28, 31, and 32, and the shafts 34, 36, 38, and 40) (a block joining step). In other words, as shown in FIG. 20, the shafts 34, 36, 38, and 40 at the side of the first joint block 17, the two second joint blocks 18, the first fitting block 19, and the second fitting block 20 respectively are detachably and elastically sandwiched between the upper and lower bearings 23, 24, 27, 28, 31, and 32 at the side of the connector block 14, the first bulb holder block 15, and the two second bulb holder blocks 16 respectively. As a result, the blocks 14 to 20 are joined together detachably and rotatably around the axis of the shafts 34, 36, 38, and 40 respectively via the joints.

Next, a cord 41 is wired on the upper surface of the blocks 14 to 20 (i.e., the surface that faces the lamp chambers 5, 6, and 7) that are joined at the joining step (a cord wiring step). In other words, the cord 41 is wired between the connector 21 of the connector block 14, the first bulb holder 25 of the first bulb holder block 15, and the second bulb holder 29 of the two second bulb holder blocks 16, via the cord guide convexities 22, 26, 30, 33, and 35.

Metal terminals 42, 43, 44, 45, 46, 47, 48, and 49 are fixed to predetermined blocks 14, 15, and 16 among the blocks 14 to 20 joined in the layout shown in FIG. 3 at the block joining step. At the same time, the terminals 42 to 49 are electrically connected to the cord 41 wired at the cord wiring step (a terminal fixing step). In other words, the terminals 42 to 49 are knocked in a bite off structure into the predetermined blocks, the connector 21 of the connector block 14, the first bulb holder 25 of the first bulb holder block 15, the second bulb holder 29 of the two second bulb holder blocks 16, and the cord 41. The bite off structure is formed based on a supporting convexity 53 and a fixed groove 54 that are provided on the block 14, and a pair of cutting edges 55 provided on the terminal 42, as shown in FIG. 21 to FIG. 25. The supporting convexity 53 is integrally provided on the upper surface of the block 14, and forms a hollow quadrangular prism. A supporting groove 58 is provided in a tapered shape on a vertical wall opposite to the supporting convexity 53. The fixed groove 54 is provided in a quadrangular concave shape on the upper surface of the block 14, and is continuous in substantially the same sizes as those of the hollow of the supporting convexity 53. On the other hand, the cutting edges 55 are provided on one piece of the terminal 42. Bent sides 59 and 59 are formed at both ends of this one piece of the terminal 42. A connecting section 60 connected to the bulb is also provided on the terminal 42. The supporting convexity 53 of the block 14 is made to support the cord 41 (refer to FIG. 22 and FIG. 23), and the cutting edges 55 of the terminal 42 are fixed to the fixing groove 54 via the cord 41 (refer to FIG. 24 and FIG. 25). Then, the cutting edges 55 of the terminal 42 disconnect an insulation coating 56 of the cord 41, and are connected to a conductive core material 57 of the cord 41. At the same time, the terminal 42 and the cord 41 are fixed to the block 14. While the above explains the bite off structure of the connector block 14 and the terminal 42 with reference to FIG. 21 to FIG. 25, bite off structures formed by the blocks 14, 15, and 16 and other terminals 43 to 49 are also substantially the same as this structure.

In the above bite off structure, four first plus terminals 42 and one first minus terminal 43 are knocked into the connector 21 and the cord 41, and are fixed respectively. Two second plus terminals 44 and one second minus terminal 45 are knocked into the first bulb holder 25 and the cord 41, and are fixed respectively. Further, one third plus terminal 46 and one third minus terminal 47 are knocked into the second bulb holder 29 for one turn signal lamp, and the cord 41, and are fixed respectively. Further, one fourth plus terminal 48 and one fourth minus terminal 49 are knocked into the second bulb holder 29 for the other backup lamp, and the cord 41, and are fixed respectively. As a result, it is possible to electrically and detachably connect the connector 21 of the connector block 14 to a connector (not shown) at the power source (at the vehicle body) side. Further, the first bulb holder 25 of the first bulb holder block 15 can electrically connect and detachably fit the first bulb 8. Further, the second bulb holder 29 of the two second bulb holder blocks 16 can electrically connect and detachably fit the second bulb 10 and the third bulb 12.

The back cover 4 shown in FIG. 3 is manufactured and structured in the manner as described above. The fitting structure of the motor vehicle lamp 1 and the back cover 4 and steps of fitting them will be explained below.

The fitting structure will be explained first. As shown in FIG. 2, in the lamp housing 2, there are provided an engagement stage 50 and an engagement concavity 51 corresponding to the elastic engagement pawl 37 and the fitting convexity 39 respectively.

The fitting step will be explained next. The first bulb 8, the second bulb 10, and the third bulb 12 are installed in the first bulb holder 25 and the two second bulb holders 29. In other words, the wedge bases of the bulbs 8, 10, and 12 respectively are inserted into the bulb holders 25 and 29. Then, the wedge bases of the bulbs 8, 10, and 12 respectively are detachably installed and are electrically connected by the terminals 44 to 49 of the bulb holders 25 and 29.

The elastic engagement pawl 37 of the back cover 4 is elastically engaged with the engagement stage 50 of the lamp housing 2. The fitting convexity 39 of the back cover 4 is engaged with the engagement concavity 51 of the lamp housing 2. Based on this, it is possible to detachably fit the back cover 4 to the lamp housing 2. The bulbs 8, 10, and 12 are disposed within the lamp chambers 5, 6, and 7 respectively. The motor vehicle lamp 1 shown in FIG. 1 and FIG. 2 is fitted in the manner as described above. The cord 41 and the cord guide convexities 22, 26, 30, 33, and 35 are not shown in FIG. 2.

The motor vehicle lamp 1 having the above-described structure according to the present embodiment has the following operation effects.

As explained above, the motor vehicle lamp 1 according to the present embodiment has the blocks 14 to 20 formed. Predetermined blocks 14 to 20 are selected from among these blocks 14 to 20 to match with the structure of the motor vehicle lamp 1. The selected blocks 14 to 20 are joined together via the joints. The cord 41 is wired between the connector 21, the first bulb holder 25, and the second bulb holder 29. The terminals 42 to 49 are fixed to the connector 21, the first bulb holder 25, and the second bulb holder 29. The terminals 42 to 49 are electrically connected to the cord 41. The back cover 4 is structured based on the above arrangement. Therefore, the motor vehicle lamp 1 according to the present embodiment can have the back cover 4 structured to match with a variety of structures of the motor vehicle lamp. Further, the motor vehicle lamp 1 according to the present embodiment can have in common the blocks 14 to 20 that constitute the back cover 4 of the motor vehicle lamp 1. Therefore, it is possible to lower the cost of the motor vehicle lamp 1.

The motor vehicle lamp 1 according to the present embodiment can have the connector block 14 disposed at an optional position. Therefore, it is possible to sufficiently cope with motor vehicles of different vehicle types or different grades. Even when external shapes of the lamp lenses 3 are the same, depending on a difference of vehicle types or grades of vehicles, it often happens that shapes of vehicle parts located near the back cover 4 are changed, or other vehicle parts are added. Therefore, there occurs a change in the position of connection between the lamp-side connector and the connector at the power source side (i.e., a vehicle body side). The motor vehicle lamp 1 according to the present embodiment can sufficiently cope with this situation by changing the position of the connector block 14.

Figure 26:
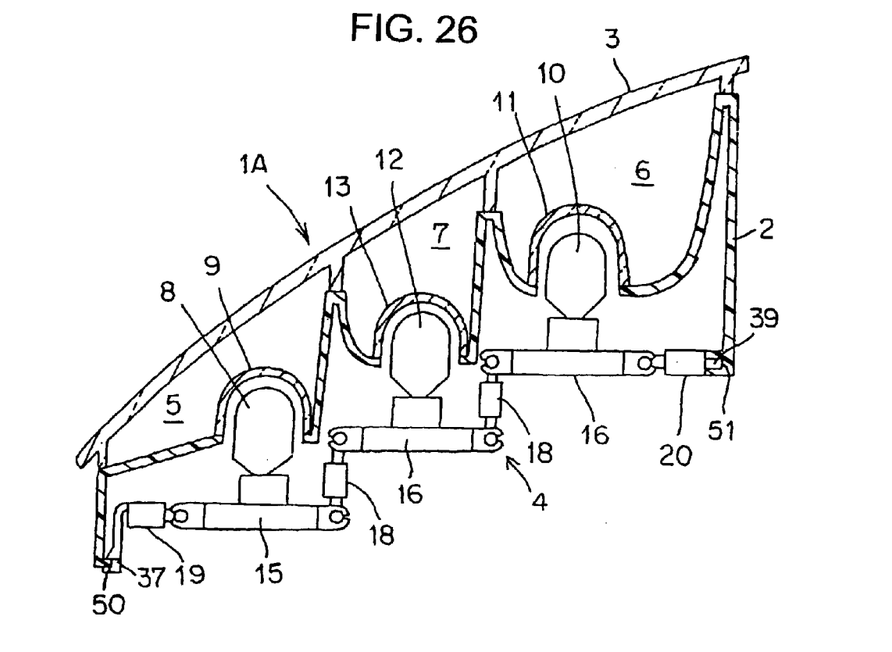
FIG. 26 is a cross-sectional view that shows a state that a back cover is laid in a stepped shape in a motor vehicle lamp having a large slant in a lamp lens.

Particularly, in the motor vehicle lamp 1 according to the present embodiment, the joints (i.e., the upper and lower bearings 23, 24, 27, 28, 31, and 32, and the shafts 34, 36, 38, and 40) can be rotated around the axis of the shafts 34, 36, 38, and 40 respectively. Therefore, it is possible to build up the blocks 14 to 20 three-dimensionally, by rotating the blocks 14 to 20 that are joined together via the hinge type joints. Consequently, it is possible to match the back cover 4 with a more variety of structures of the motor vehicle lamp. For example, as shown in FIG. 26, when a motor vehicle lamp 1A has the lamp lens 3 slanted large, the second joint block 18 between the horizontal first bulb holder block 15 and one of the horizontal second bulb holder blocks 16 is bent perpendicularly. Further, the second joint block 18 between one of the horizontal second bulb holder blocks 16 and the other horizontal second bulb holder blocks 16 is bent perpendicularly. Based on this, the horizontal first bulb holder block 15, the one of the second bulb holder blocks 16, and the other second bulb holder block 16 are disposed in a stepped shape. As explained above, according to the present embodiment, it is possible to match the motor vehicle lamps 1 and 1A with a more variety of structures of the motor vehicle lamp, by three-dimensionally building up the blocks 14 to 20. It is possible to have the back cover 4 consisting of the blocks 14 to 20 bent two dimensionally or three dimensionally. Therefore, it is possible to match the back cover 4 with not only the motor vehicle lamp that has planer the lamp lens 3, but also the motor vehicle lamp that has the lamp lens 3 curved in a horizontal direction or a vertical direction. Further, in the motor vehicle lamps 1 and 1A according to the present embodiment, it is possible to elastically sandwich the shafts 34, 36, 38, and 40 respectively between the upper and lower bearings 23, 24, 27, 28, 31, and 32. Therefore, it is possible to securely join the blocks 14 to 20 together.

The motor vehicle lamp 1 according to the present embodiment has the joint blocks 17 and 18, in addition to the connector block 14 and the bulb holder blocks 15 and 16. Therefore, the number of combinations of the blocks 14 to 20 increases, and it is also possible to join the back cover 4 with a more variety of structures of the motor vehicle lamp. Further, the motor vehicle lamp 1 according to the present embodiment can have in common the connector block 14 and the bulb holder blocks 15 and 16, and can have in common the joint blocks 17 and 18. Therefore, even when the number of types of blocks increases, it is possible to lower the cost of the motor vehicle lamp 1.

The motor vehicle lamp 1 according to the present embodiment has the cord guide convexities 22, 26, 30, 33, and 35 in the blocks 14 to 18. Therefore, it is possible to wire the cord 41 securely and stably. The cord 41 and the cord guide convexities 22, 26, 30, 33, and 35 are not shown in FIG. 2 and FIG. 26.

Figure 27:
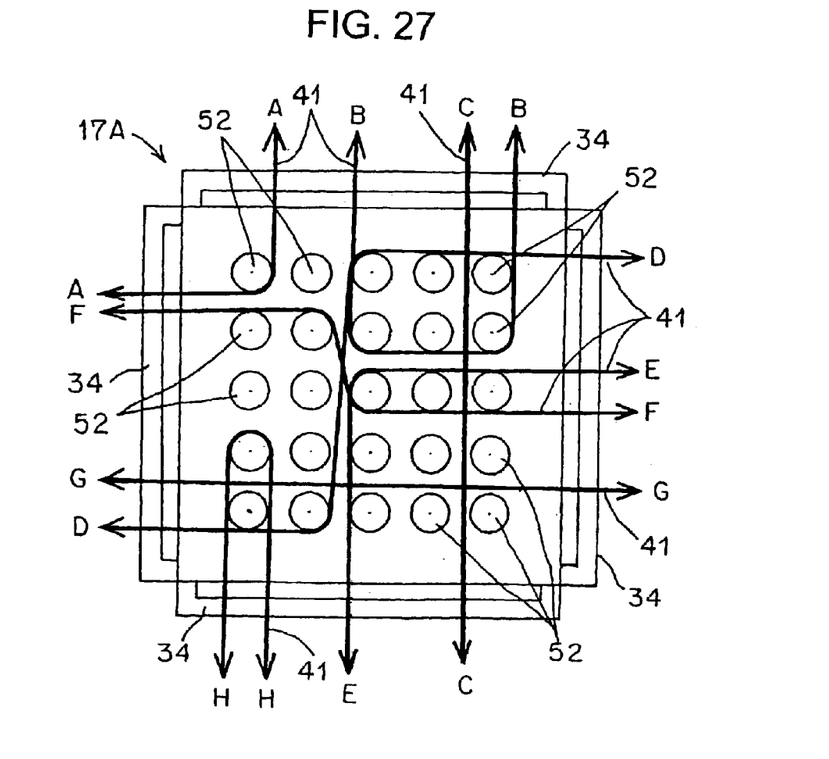
FIG. 27 is a front view of a modification of the first joint block.

FIG. 27 is a front view of a modification of the first joint block. A first joint block 17A according to this modification has a plurality (25, in this example) of cord guide convexities 52, each formed in a circular shape. These cord guide convexities 52 are disposed symmetrically both in left and right directions and in up and down directions respectively. Consequently, the first joint block 17A according to this modification can obtain a variety of cord wiring patterns with this joint block 17A of the modification, based on the wiring by guiding the cord 41 along the cord guide convexities 52. For example, it is possible to wire the cord 41 in a variety of patterns such as A to A, B to B, C to C, D to D, E to E, F to F, G to G, and H to H, respectively, as shown in FIG. 27. The first joint block 17A of the modification has the cord guide convexities 52 disposed symmetrically both in left and right directions and in up and down directions respectively. Therefore, there is no directivity in left and right directions nor in up and down directions in the assembling of the joint block 17A. Consequently, there occurs no erroneous assembling in left and right directions or in up and down directions in the joint block 17A.

In the first joint block 17A according to this modification, each cord guide convexity 52 may have a shape other than a circular shape, such as a square, a rectangle, an ellipse, or an oval. In the first joint block 17A according to this modification, the cord guide convexities 52 may be disposed symmetrically either in left and right directions or in up and down directions.

Figure 28:
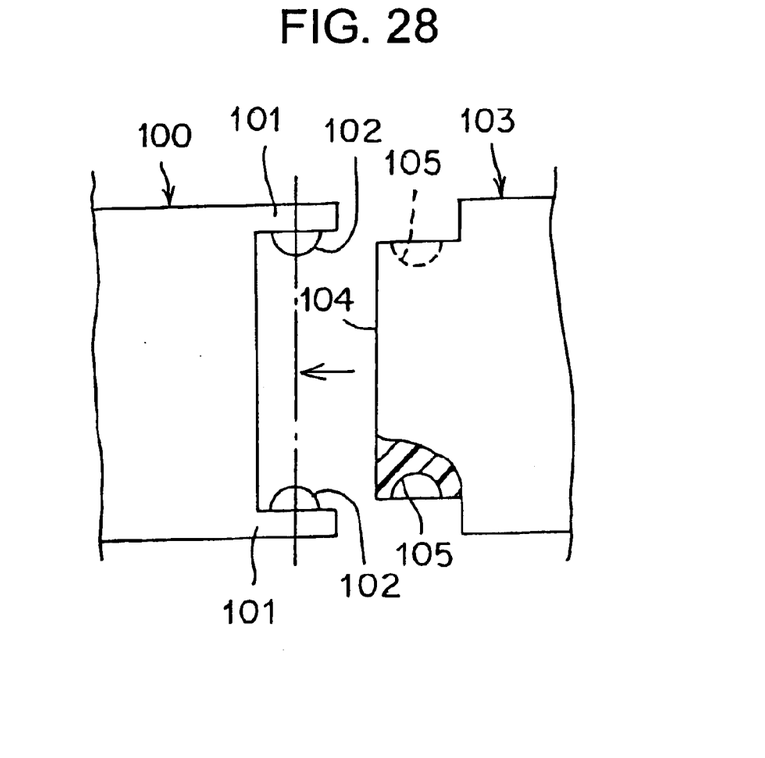
FIG. 28 is an explanatory view of a first modification of the joint.

FIG. 28 is an explanatory view of a first modification of the joint. The joint according to the first modification will be explained below. A pair of elastic pieces 101 is integrally provided at both ends of one side of one block 100. Semispherical fitting convexities 102 are integrally provided on the pair of elastic pieces 101 to face each other. A projection 104 is integrally provided at the center of one side of another block 103. Semispherical engagement concavities 105 are integrally provided at both ends of the projection 104. The pair of fitting convexities 102 and the pair of engagement concavities 105 constitute a joint of the first modification. As shown by an arrow mark in FIG. 28, the projection 104 of the block 103 is pressed into between the pair of elastic pieces 101 of the block 100, thereby to detachably engage the pair of fitting convexities 102 and the pair of engagement concavities 105. Based on this, the block 100 and the other block 103 are rotatably joined together around an axis (shown by a chain line in FIG. 28) that connects the pair of fitting convexities 102 (or the pair of engagement concavities 105) in the engaged state, via the joint according to the first modification. As explained above, according to the joint of the first modification, it is possible to build up the blocks 100 and 103 three-dimensionally by rotating the blocks 100 and 103 joined together via the joint, like with the above joint. Consequently, it is possible to match the back cover 4 with a more variety of structures of the motor vehicle lamp. As the joint according to the first modification consists of the pair of fitting convexities 102 and the pair of engagement concavities 105, it is possible to join the blocks 100 and 103 together more securely in a simple structure. Further, the joint according to the first modification can securely join the blocks 100 and 103 together using the pair of elastic pieces 101.

Figure 29:
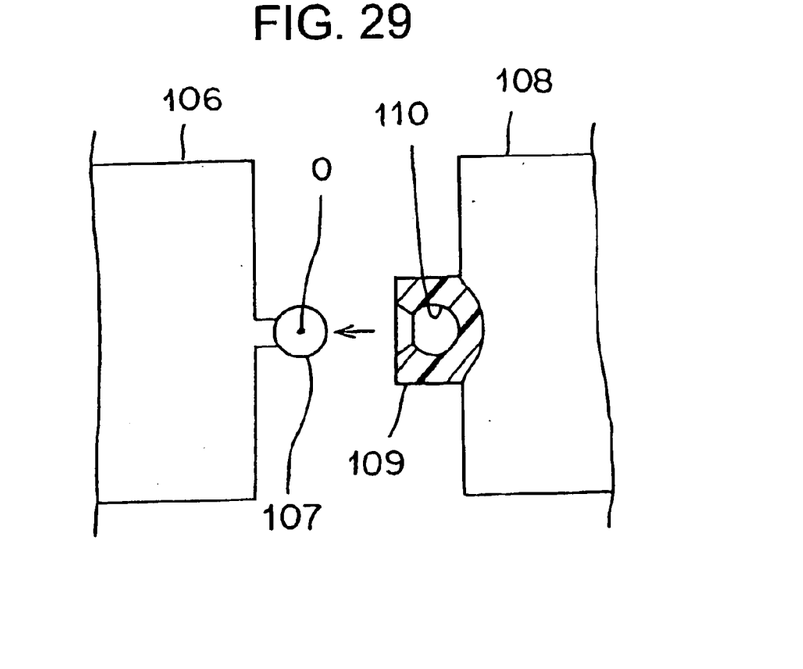
FIG. 29 is an explanatory view of a second modification of the joint.

FIG. 29 is an explanatory view of a second modification of the joint. The joint according to the second modification will be explained below. A fitting spherical convexity 107 is integrally provided at the center of one side of one block 106. A projection 109 is integrally provided at the center of one side of the other block 108. An engagement spherical concavity (i.e., a receiver) 110 is provided at the center of an end surface of the projection 109. The fitting spherical convexity 107 and the engagement spherical concavity 110 constitute the joint according to the second modification. As shown by an arrow mark in FIG. 29, the fitting spherical convexity 107 of one block 106 is detachably engaged with the engagement spherical concavity 110 of the other block 108. Based on this, it is possible to join the block 106 and the other block 108 together rotatably around a center O of the fitting spherical convexity 107 (or the engagement spherical concavity 110) in the engaged state, via the joint according to the second modification. As explained above, according to the joint of the second modification, it is possible to build up the blocks 106 and 108 three-dimensionally by rotating the blocks 106 and 108 joined together via the joint, like the above joint according to the first modification. Consequently, it is possible to match the back cover 4 with a more variety of structures of the motor vehicle lamp. The joint according to the second modification joins the blocks 106 and 108 together based on the engagement between the fitting spherical convexity 107 and the engagement spherical concavity 110. Therefore, it is possible to rotate the blocks 106 and 108 together in an optional direction around the center O of the fitting spherical convexity 107. Consequently, it is possible to build up the blocks 106 and 108 three dimensionally in a more variety of structures.

While the motor vehicle lamp 1 according to the present embodiment has been explained for the rear combination lamps, it is also possible to apply the present invention to other motor vehicle lamps.

The motor vehicle lamp 1 according to the present embodiment uses the first joint block 17, the second joint blocks 18, the first fitting block 19, and the second fitting block 20. However, the motor vehicle lamp 1 according to the present invention may use only the connector block 14, the first bulb holder block 15, and the second bulb holder blocks 16, without using the first joint block 17, the second joint blocks 18, the first fitting block 19, and the second fitting block 20. Alternatively, the motor vehicle lamp 1 according to the present invention may use only the connector block 14, and one kind of bulb holder block. In this case, one bulb is disposed within the light chamber.

While the motor vehicle lamp 1 according to the present embodiment has the cord guide convexities provided on the blocks 14 to 18, it is not always necessary to provide the cord guide convexities in the present invention. While the cord guide convexities of the blocks 14 to 18 have elliptical shapes, each of the cord guide convexities according to the present invention may have a shape other than the ellipse, such as, for example, a square, a rectangle, a circle, or an oval.

While the motor vehicle lamp 1 according to the present embodiment has a rotation type (a hinge type) joint, the joint according to the present invention does not need to be the rotation type, but may be a fixed type joint.

The motor vehicle lamp 1 according to the present embodiment has the upper and lower bearings provided in the connector block 14, the first bulb holder block 15, and the second bulb holder blocks 16 respectively. The motor vehicle lamp 1 also has the shafts provided in the first joint blocks 17 and 17A, the second joint blocks 18, the first fitting block 19, and the second fitting block 20 respectively. In the present invention, it is also possible to provide both the upper and lower bearings and the shafts, on each block.

Figure 17:
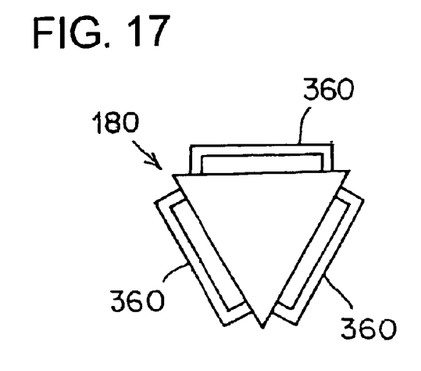
FIG. 17 is a front view of a triangular block.

The motor vehicle lamp 1 according to the present embodiment has each of the blocks 14 to 20 formed in a square or a rectangle as viewed from the front side. In the present invention, each block may have a shape other than the square or the rectangle, such as a regular triangle as viewed from the front side, as shown in FIG. 17. A triangular block 180 shown in FIG. 17 has a shaft 360 integrally provided on each of the three sides of the triangular block main body. Based on the use of this triangular block 180, it is possible to bend each of the blocks 14 to 20, and 180 in a direction other than a horizontal direction and a vertical direction, such as a distorted direction. Therefore, it is possible to build up the blocks 14 to 20, and 180 three dimensionally in a more variety of patterns.

Each block may have a shape other than the above-described shapes as viewed from the front side, such as, for example, a trapezoid, a lozenge, a parallelogram, a pentagon or higher polygon, a circle, an oval, or an ellipse. When blocks of any one of these shapes are used, it is possible to bend the blocks in more complex directions. It is possible to build up the blocks three dimensionally in a more variety of patterns. It is possible to use the above triangular block 180 for a joint block or other block.

The wedge base type bulbs (T bulb) are used for the bulbs 8, 10, and 12 in the above embodiment. It is also possible to use a bulb other than the wedge base type bulb, such as, for example, a cap type bulb (S bulb) and the like in the present invention.

As explained above, the back cover 4 according to the present embodiment has the blocks 14 to 20 formed, in a similar manner to that of the motor vehicle lamp 1 explained above. Predetermined blocks 14 to 20 are selected from among these blocks 14 to 20 to match with the structure of the motor vehicle lamp 1. The selected blocks 14 to 20 are joined together via the joints. The cord 41 is wired between the connector 21, the first bulb holder 25, and the second bulb holder 29. The terminals 42 to 49 are fixed to the connector 21, the first bulb holder 25, and the second bulb holder 29. The terminals 42 to 49 are electrically connected to the cord 41. The back cover 4 is structured based on the above arrangement. Therefore, the back cover 4 according to the present embodiment can be structured to match with a variety of structures of the motor vehicle lamp 1, in a similar manner to that of the motor vehicle lamp 1 explained above. Further, the back cover 4 according to the present embodiment can have the blocks 14 to 20 in common, in a similar manner to that of the motor vehicle lamp 1 explained above. Therefore, it is possible to lower the cost of the back cover 4.

The method of manufacturing the back cover 4 according to the present embodiment is as follows. First, the blocks 14 to 20 are formed in a similar manner to that of the motor vehicle lamp 1 and the back cover 4 explained above. Predetermined blocks 14 to 20 are selected from among these blocks 14 to 20 to match with the structure of the motor vehicle lamp 1. The selected blocks 14 to 20 are joined together via the joints. The cord 41 is wired between the connector 21, the first bulb holder 25, and the second bulb holder 29. The terminals 42 to 49 are fixed to the connector 21, the first bulb holder 25, and the second bulb holder 29. The terminals 42 to 49 are electrically connected to the cord 41. The back cover 4 is manufactured in the above process. Therefore, based on the method of manufacturing the back cover 4 according to the present embodiment, it is possible to manufacture the back cover 4 to match it with a variety of structures of the motor vehicle lamp, in a similar manner to that of the motor vehicle lamp 1 and the back cover 4 explained above. Further, the method of manufacturing the back cover 4 according to the present embodiment can have the blocks 14 to 20 in common, in a similar manner to that of the motor vehicle lamp 1 and the back cover 4 explained above. Therefore, it is possible to lower the cost of the back cover 4.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

This application claims priority from Japanese Patent Application 2002-144749, filed May 20, 2002, which is incorporated herein by reference in its entirety.

What is claimed is:

1. A motor vehicle lamp comprising:
  a lamp chamber defined by a lamp lens, a back cover, and a lamp housing between the lamp lens and the back cover, wherein the back cover includes
    a first block that has
      a first joint;
      a connector that is electrically and detachably connected with a power connector connected to a power source; and
      a first terminal to electrically connect an electric cord to the connector; and
    a second block that has
      a second joint that joins with the first joint;
      a bulb holder that detachably holds and is electrically connected with a bulb positioned between the back cover and the lamp housing; and
      a second terminal to electrically connect the electric cord to the bulb holder.

2. The motor vehicle lamp according to claim 1, wherein the first and second joints include any one of a shaft and a bearing that detachably and elastically sandwiches the shaft so that the joint having the bearing is rotatable around an axis of the shaft.

3. The motor vehicle lamp according to claim 1, wherein the first and second joints include any one of a pair of convexities and a pair of concavities that is detachably engaged with the pair of convexities so that the joint having the pair of convexities is rotatable around an axis between the concavities.

4. The motor vehicle lamp according to claim 1, wherein the first and second joints include any one of a ball and a spherical concavity that is detachably engaged with the ball so that the joint having the spherical concavity is rotatable around the center of the ball.

5. The motor vehicle lamp according to claim 1, further comprising
  a third block that is connected between the first and second blocks and has a third joint to join to any one of the first and second joints.

6. The motor vehicle lamp according to claim 1, wherein at least one of the first and second blocks has a plurality of cord guides that are provided on the surface thereof facing the lamp chamber, and the cord guides are disposed symmetrically either in left and right directions or in up and down directions or both.

7. A back cover of a motor vehicle lamp, comprising:
  a lamp chamber defined by a lamp lens, the back cover, and a lamp housing between the lamp lens and the back cover, the back cover having
    a first block that has
      a first joint;
      a connector that is electrically and detachably connected with a power connector connected to a power source; and
      a first terminal to electrically connect an electric cord to the connector; and
    a second block that has
      a second joint that joins with the first joint;
      a bulb holder that detachably holds and is electrically connected with a bulb positioned between the back cover and the lamp housing; and
      a second terminal to electrically connect the electric cord to the bulb holder.

8. The back cover according to claim 7, wherein the first and second joints include any one of a shaft and a bearing that detachably and elastically sandwiches the shaft so that the joint having the bearing is rotatable around an axis of the shaft.

9. The back cover according to claim 7, wherein the first and second joints include any one of a pair of convexities and a pair of concavities that is detachably engaged with the pair of convexities so that the joint having the pair of convexities is rotatable around an axis between the concavities.

10. The back cover according to claim 7, wherein the first and second joints include any one of a ball and a spherical concavity that is detachably engaged with the ball so that the joint having the spherical concavity is rotatable around the center of the ball.

11. The back cover according to claim 7, further comprising:
a third block that is connected between the first and second blocks and has a third joint to joint to any one of the first and second joints.

12. The back cover according to claim 7, wherein
at least one of the first and second blocks has a plurality of cord guides that are provided on the surface thereof facing the lamp chamber, and the cord guides are disposed symmetrically either in left and right directions or in up and down directions or both.

13. A method of manufacturing a back cover of a motor vehicle lamp that has a lamp chamber defined by a lamp lens, a back cover, and a lamp housing between the lamp lens and the back cover, the method comprising:
forming
a first block that has
a first joint;
a connector that is electrically and detachably connected with a power connector connected to a power source; and
a first terminal to electrically connect an electric cord to the connector; and
one or a plurality of types of second blocks each that have
a second joint that joins with the first joint;
a bulb holder that detachably holds and is electrically connected with a bulb positioned between the back cover and the lamp housing; and
a second terminal to electrically connect the electric cord to the bulb holder;
selecting at least one of the second blocks according to the number and types of bulbs of the motor vehicle lamp;
joining the second block selected at the selecting step with the first block through the first and second joints, according to a layout of the bulbs and a connector of the motor vehicle lamp;
wiring the electric cord between the connector of the first block and the bulb holder of the second block joined at the joining step;
fixing the first terminal to the connector across the electric cord wired at the wiring step; and
fixing the second terminal to the bulb holder across the electric cord wired at the wiring step.

14. The method according to claim 13, wherein
at the forming step, the first and second joints include any one of a shaft and a bearing that detachably and elastically sandwiches the shaft so that the joint having the bearing is rotatable around an axis of the shaft.

15. The method according to claim 13, wherein
at the forming step, the first and second joints include any one of a pair of convexities and a pair of concavities that is detachably engaged with the pair of convexities so that the joint having the pair of convexities is rotatable around an axis between the concavities.

16. The method according to claim 13, wherein
at the forming step, the first and second joints include any one of a ball and a spherical concavity that is detachably engaged with the ball so that the joint having the spherical concavity is rotatable around the center of the ball.

17. The method of manufacturing a back cover of a motor vehicle lamp according to claim 13, wherein
at the forming step, further forming one or a plurality of types of third blocks each that are connected between the first and second blocks and have a third joint to joint to any one of the first and second joints;
at the selecting step, further selecting at least one of the third blocks according to the number and types of bulbs of the motor vehicle lamp; and
at the joining step, further joining the third block selected at the selecting step with the first and second blocks.

18. The method of manufacturing a back cover of a motor vehicle lamp according to claim 13, wherein
at the forming step, further forming one or a plurality of types of fourth blocks each that are connected to any one of the first and second blocks and have a fourth joint that detachably joins with the lamp housing;
at the selecting step, further selecting at least one of the fourth blocks according to the number and types of bulbs of the motor vehicle lamp; and
at the joining step, further joining the fourth block selected at the selecting step with the lamp housing.

19. The method of manufacturing a back cover of a motor vehicle lamp according to claim 13, wherein
at the forming step, further forming one or a plurality of types of third blocks each that are connected between the first and second blocks and have a third joint to join any one of the first and second joints, and forming one or a plurality of types of fourth blocks each that are connected to any one of the first and second blocks and have a fourth joint that detachably joins with the lamp housing;
at the selecting step, further selecting at least one of the third blocks and at least one of the fourth blocks, according to the number and types of bulbs of the motor vehicle lamp; and
at the joining step, further joining the third block selected at the selecting step with the first and second blocks, and joining the fourth block selected at the selecting step with the lamp housing.

20. The method according to claim 13, wherein
at the forming step, at least one of the first and second blocks has a plurality of cord guides that are provided on the surface thereof facing the lamp chamber, and the cord guides are disposed symmetrically either in left and right directions or in up and down directions or both.

* * * * *